United States Patent
Hosoya et al.

(10) Patent No.: US 9,021,792 B2
(45) Date of Patent: May 5, 2015

(54) EXHAUST GAS PURIFICATION DEVICE

(75) Inventors: Mitsuru Hosoya, Tokyo (JP); Yoshihiro Kawada, Kanagawa (JP); Shinya Sato, Tokyo (JP)

(73) Assignee: Hino Motors, Ltd., Tokyo (JP)

(*) Notice: Subject to any disclaimer, the term of this patent is extended or adjusted under 35 U.S.C. 154(b) by 0 days.

(21) Appl. No.: 14/003,540

(22) PCT Filed: Mar. 6, 2012

(86) PCT No.: PCT/JP2012/055606
§ 371 (c)(1),
(2), (4) Date: Sep. 6, 2013

(87) PCT Pub. No.: WO2012/124531
PCT Pub. Date: Sep. 20, 2012

(65) Prior Publication Data
US 2014/0000246 A1    Jan. 2, 2014

(30) Foreign Application Priority Data

Mar. 15, 2011  (JP) .................................. 2011-056111
Jun. 28, 2011  (JP) .................................. 2011-143032

(51) Int. Cl.
*F01N 3/00* (2006.01)
*F01N 3/02* (2006.01)
(Continued)

(52) U.S. Cl.
CPC .................. *F01N 3/08* (2013.01); *B01D 53/90* (2013.01); *B01D 53/9418* (2013.01);
(Continued)

(58) Field of Classification Search
USPC ..................... 60/286, 295, 297, 299, 301, 311
See application file for complete search history.

(56) References Cited

U.S. PATENT DOCUMENTS 7,790,127 B1*  9/2010  Lee et al. ................... 423/213.2
2007/0068525 A1*  3/2007  Offenhuber et al. ..... 128/204.21
(Continued)

FOREIGN PATENT DOCUMENTS

JP   59-078909   5/1984
JP   06-024710   2/1994
(Continued)

OTHER PUBLICATIONS

International Preliminary Report on Patentability and English translation thereof, mail date is Oct. 10, 2013.
International Search Report, mail date is May 22, 2012.
Notification of Reasons for Refusal in JP Application No. 2011-056111, with English language translation, mailed Feb. 17, 2015.
Extended European Search Report in EP Application No. 12756980.4, mailed Mar. 19, 2015.

*Primary Examiner* — Audrey K Bradley
*Assistant Examiner* — Dapinder Singh
(74) *Attorney, Agent, or Firm* — Greenblum & Bernstein, P.L.C.

(57) ABSTRACT

A selective catalytic reduction catalyst capable of reducing the $NO_x$ in exhaust gas to $N_2$ is arranged in an exhaust pipe of an engine. Fluid feed has a fluid injecting nozzle facing the exhaust pipe on the exhaust gas upstream side from the selective catalytic reduction catalyst. The fluid feed is configured such that a urea fluid that functions as a reducing agent is fed with the selective catalytic reduction catalyst from the fluid injecting nozzle to the exhaust pipe. Ozone feed includes an ozone injecting nozzle that faces the exhaust pipe on the exhaust gas upstream side from the selective catalytic reduction catalyst, and on the exhaust gas upstream side or the exhaust gas downstream side from the fluid injecting nozzle. The ozone feed is configured such that ozone is fed from the ozone injecting nozzle to the exhaust pipe.

15 Claims, 7 Drawing Sheets

(51) Int. Cl.
*F01N 3/10* (2006.01)
*F01N 3/20* (2006.01)
*F01N 3/08* (2006.01)
*B01D 53/90* (2006.01)
*C01B 13/02* (2006.01)
*C01B 13/11* (2006.01)
*F01N 13/00* (2010.01)
*B01D 53/94* (2006.01)

(52) U.S. Cl.
CPC ..... *B01D 53/9431* (2013.01); *B01D 2251/104* (2013.01); *B01D 2251/2067* (2013.01); *B01D 2258/012* (2013.01); *F01N 3/2066* (2013.01); *F01N 2240/38* (2013.01); *F01N 2610/02* (2013.01); *F01N 2610/06* (2013.01); *Y02T 10/24* (2013.01); *C01B 13/0251* (2013.01); *C01B 13/11* (2013.01); *C01B 2201/64* (2013.01); *C01B 2201/66* (2013.01); *F01N 13/009* (2013.01)

(56) References Cited

U.S. PATENT DOCUMENTS

| | | |
|---|---|---|
| 2009/0288396 A1 | 11/2009 | Sakata et al. |
| 2010/0221164 A1 | 9/2010 | Lee et al. |

FOREIGN PATENT DOCUMENTS

| | | |
|---|---|---|
| JP | 06-234505 | 8/1994 |
| JP | 08-281061 | 10/1996 |
| JP | 2000-262852 | 9/2000 |
| JP | 2007-016635 | 1/2007 |
| JP | 2008-163881 | 7/2008 |
| JP | 2009-226327 | 10/2009 |
| JP | 2009-264285 | 11/2009 |
| JP | 2009-281294 | 12/2009 |
| WO | 2008/115073 | 9/2008 |

* cited by examiner

EXHAUST GAS PURIFICATION DEVICE

TECHNICAL FIELD

The present invention relates to a device for purifying exhaust gas by reducing nitrogen oxide contained in the exhaust gas of a diesel engine (hereinafter referred to as $NO_x$).

BACKGROUND ART

As a conventional type exhaust gas purification device, an exhaust gas purification device of an internal combustion engine comprising an $NO_x$ holding material arranged in an exhaust passage of the internal combustion engine, ozone introducing means for introducing ozone to an exhaust passage arranged in an exhaust passage on the upstream side from the $NO_x$ holding material, a three-way catalyst arranged in an exhaust passage on the downstream side from the $NO_x$ holding material, a selective catalytic reduction catalyst that is prepared to provide the activity at a lower temperature than the three-way catalyst arranged on the upstream side from the three-way catalyst, and oxygen introducing means for introducing oxygen to an exhaust gas on the upstream side from the selective catalytic reduction catalyst arranged on the upstream side from the selective catalytic reduction catalyst is disclosed (e.g. Japanese Unexamined Patent Application Publication No. 2008-163881).

The exhaust gas purification device of an internal combustion engine thus configured is provided with a function of purification by reacting a $NO_x$ and a hydrocarbon (HC) under lean atmosphere, since a selective catalytic reduction catalyst thereof is prepared so as to be activated at a lower temperature than a three-way catalyst. Consequently, a $NO_x$ that fails to be absorbed or trapped in a $NO_x$ holding material before the three-way catalyst is activated can be efficiently purified to improve $NO_x$ purification performance. In addition, since the selective catalytic reduction catalyst is arranged on the upstream side from the three-way catalyst, the activity of the selective catalytic reduction catalyst can be swiftly provided before cold start of the internal combustion engine. After the activity of the three-way catalyst is provided to some extent, $NO_x$ that cannot be purified by the selective catalytic reduction catalyst can be purified by the three-way catalyst. As a result, $NO_x$ purification performance can be improved.

PRIOR ART DOCUMENT

Patent Document

Patent Document 1: Japanese Unexamined Patent Application Publication No. 2008-163881 (Claim 1, Paragraphs 0014 and 0015, FIG. 8)

SUMMARY OF THE INVENTION

Problems to be Solved by the Invention

However, the above conventional exhaust gas purification device of an internal combustion engine shown in Japanese Unexamined Patent Application Publication No. 2008-163881 has an insufficient $NO_x$ reduction efficiency when the exhaust gas temperature is low because a selective catalytic reduction catalyst thereof purifies $NO_x$ by using hydrocarbon (HC).

The first aim of the present invention is to provide an exhaust gas purification device that can efficiently reduce $NO_x$ even when the exhaust gas temperature is low. The second aim of the present invention is to provide an exhaust gas purification device that can efficiently reduce $NO_x$ within almost all exhaust gas temperature ranges.

Means for Solving the Problems

The first viewpoint of the present invention is, as shown in FIG. 1, an exhaust gas purification device comprising: a selective catalytic reduction catalyst 19 capable of reducing $NO_x$ in an exhaust gas to $N_2$ arranged in an exhaust pipe 16 of an engine 11; fluid feed means 21 that has a fluid injecting nozzle 23 facing the exhaust pipe 16 on the exhaust gas upstream side from the selective catalytic reduction catalyst 19 and feeds a urea fluid 22 that functions as a reducing agent in the selective catalytic reduction catalyst 19 from the fluid injecting nozzle 23 to the exhaust pipe 16; and ozone feed means 41 that has an ozone injecting nozzle 43 facing the exhaust pipe 16 on the exhaust gas upstream side from the selective catalytic reduction catalyst 19 and on the exhaust gas upstream side from the fluid injecting nozzle 23 and feeds an ozone 42 capable of oxidizing NO contained in the exhaust gas to $NO_2$ from the ozone injecting nozzle 43 to the exhaust pipe 16.

The second viewpoint of the present invention is an invention based on the first viewpoint, as shown in FIG. 2, further comprising: an ozone generator 70 that generates the ozone 42 by using oxygen in the air; and an oxidation catalyst 92 capable of oxidizing the NO in the exhaust gas to $NO_2$ at the temperature higher than a specific exhaust gas temperature arranged in an exhaust pipe 16 on the exhaust gas upstream side from the fluid injecting nozzle 23 and the ozone injecting nozzle 42.

The third viewpoint of the present invention is an invention based on the second viewpoint, as shown in FIGS. 3 and 4, the ozone generator 70 further comprising: a compressor 71 that compresses the air; a drier 72 that dries the compressed air compressed by the compressor 71; an ozone converter 73 that converts part of oxygen in the compressed air dried by the drier 72 into ozone; and an air separator 74 that separates the compressed air dried by the drier 72 into an oxygen-enriched gas having a high oxygen concentration and a nitrogen-enriched gas having a high nitrogen concentration arranged between the drier 72 and the ozone converter 73, wherein part of oxygen in the oxygen-enriched gas separated by the air separator 74 is introduced into the ozone converter 73 to be converted into ozone by the ozone converter 73, and the moisture in the drier 72 is removed by the nitrogen-enriched gas separated by the air separator 74 to recycle the drier 72.

The fourth viewpoint of the present invention is an invention based on the third viewpoint, as shown in FIGS. 3, 4 and 7, wherein the air separator 74 is composed of an oxygen-enriched membrane 74a, an oxygen-enriched gas is generated when the compressed air dried by the drier 72 passes through the oxygen-enriched membrane 74a, and a nitrogen-enriched gas is generated when the compressed air dried by the drier 72 does not pass through the oxygen-enriched membrane 74a.

The fifth viewpoint of the present invention is an invention based on the third or fourth viewpoint, as shown in FIGS. 3 and 4, wherein a nitrogen-enriched gas separated by the air separator 74 passes through a purge pipe 76 to be fed into the drier 72, and a nitrogen-enriched gas flow regulating valve 79 that regulates the flow rate of the nitrogen-enriched gas passing through the purge pipe 76 is arranged in the purge pipe 76.

The sixth viewpoint of the present invention is an invention based on the third through fifth viewpoints, as shown in FIGS. 3 and 4, wherein an air tank 78 that stores the compressed air compressed by the compressor 71 is arranged between the compressor 71 and the drier 72.

The seventh viewpoint of the present invention is an invention based on the first or second viewpoint, as shown in FIG. 1 or 2, wherein a urea fluid 22 is any of an ammonia gas or a urea water.

The eighth viewpoint of the present invention is an invention based on the first or second viewpoint, as shown in FIG. 1 or 2, wherein the selective catalytic reduction catalyst 19 is configured by coating a honeycomb carrier with zeolite or zirconia.

The ninth viewpoint of the present invention is an invention based on the second viewpoint, as shown in FIG. 2, wherein a particulate filter 93 that traps a particulate in the exhaust gas is further arranged in the exhaust pipe 16 on the exhaust gas upstream side from the fluid injecting nozzle 23 and the ozone injecting nozzle 43 and on the exhaust gas downstream side from the oxidation catalyst 92.

Effect of the Invention

In the exhaust gas purification device of the first viewpoint of the present invention, when ozone is fed from an ozone injecting nozzle of ozone feed means to an exhaust pipe, NO contained in $NO_x$ in the exhaust gas reacts with the ozone to be swiftly converted into highly reactive $NO_2$. When the highly reactive $NO_2$ flows into a selective catalytic reduction catalyst together with a urea fluid fed from a fluid injecting nozzle of fluid feed means to the exhaust pipe, the highly reactive $NO_2$ is subjected to selective reduction reaction with the urea fluid by a selective catalytic reduction catalyst to be reduced to $N_2$, even when the exhaust gas temperature is low. Consequently, $NO_x$ can be efficiently reduced, even when the exhaust gas temperature is low.

In the exhaust gas purification device of the second viewpoint of the present invention, when ozone is fed from an ozone injecting nozzle of ozone feed means to an exhaust pipe, NO contained in $NO_x$ in the exhaust gas reacts with the ozone to be swiftly converted into highly reactive $NO_2$. When the highly reactive $NO_2$ flows into a selective catalytic reduction catalyst together with a urea fluid fed from a fluid injecting nozzle of fluid feed means to the exhaust pipe, the highly reactive $NO_2$ is subjected to selective reduction reaction with the urea fluid by a selective catalytic reduction catalyst to be reduced to $N_2$, even when the exhaust gas temperature is low. Consequently, $NO_x$ can be efficiently reduced, even when the exhaust gas temperature is low. Meanwhile, when the exhaust gas temperature is a specific temperature or higher, an oxidation catalyst oxidizes the NO in the exhaust gas to a highly reactive $NO_2$. Thus, when the highly reactive $NO_2$ flows into a selective catalytic reduction catalyst together with the urea fluid fed from a fluid injecting nozzle of fluid feed means to the exhaust pipe, the highly reactive $NO_2$ is subjected to selective reduction reaction with the urea fluid by a selective catalytic reduction catalyst to be reduced to $N_2$, even when the exhaust gas temperature is high. Consequently, $NO_x$ can be efficiently reduced, even when the exhaust gas temperature is high. Consequently, $NO_x$ can be efficiently reduced within almost all exhaust gas temperature ranges.

In the exhaust gas purification device of the third viewpoint of the present invention, part of oxygen in an oxygen-enriched gas separated by an air separator is introduced into an ozone converter to be converted into ozone by the ozone converter and the moisture in the drier is removed by a nitrogen-enriched gas separated by the air separator to recycle the drier. Thus, the drier can be efficiently recycled. Specifically, since it is not necessary to directly use the air compressed by the compressor to recycle the drier, the consumption amount of the air compressed by the compressor can be reduced. As a result, the delivery capacity of the compressor can be reduced to make the compressor smaller in size. Also, an increase in the oxygen-enriched gas can increase not only the moisture in the compressed air removed by the drier, but also the nitrogen-enriched gas separated by the air separator, resulting in removal of increased moisture in the drier by the nitrogen-enriched gas. Consequently, a change in the oxygen-enriched gas amount can cause a change in the nitrogen-enriched gas amount to efficiently recycle the drier.

In the exhaust gas purification device of the fourth viewpoint of the present invention, the air separator is composed of oxygen-enriched membranes, an oxygen-enriched gas is generated when the compressed air dried by the drier passes through the oxygen-enriched membranes, and a nitrogen-enriched gas is generated when the compressed air dried by the drier does not pass through the oxygen-enriched membranes. The oxygen-enriched gas and the nitrogen-enriched gas are assuredly separated by the oxygen-enriched membranes, regardless of whether the resulting hydrocarbon adheres to the oxygen-enriched membranes or not. Consequently, the separating function of the oxygen-enriched gas and the nitrogen-enriched gas by the oxygen-enriched membranes cannot be reduced, regardless of whether the hydrocarbon adheres on the oxygen-enriched membranes or not.

In the exhaust gas purification device of the fifth viewpoint of the present invention, a flow regulating valve is arranged in a purge pipe that feeds a nitrogen-enriched gas separated by an air separator to a drier. As a result, while a compressor is maintained in rated operation, by simply regulating the flow rate of the nitrogen-enriched gas passing through the purge pipe by the flow regulating valve, the flow of an oxygen-enriched gas can be also adjusted. Moreover, it is not necessary to use a regulator that regulates the pressure of the compressed air compressed by the compressor, and it is not necessary to use a buffer tank that temporarily stores the compressed air or a surge tank. Therefore, an ozone generator can be configured with a relatively small number of components and the flow passage resistance of the compressed air can be reduced to further make the compressor smaller in size.

In the exhaust gas purification device of the sixth viewpoint of the present invention, an air tank that stores the compressed air compressed by a compressor is arranged between the compressor and a drier. Therefore, even when the flow rate of the oxygen-enriched gas and the nitrogen-enriched gas is fluctuated, the compressed air can be sufficiently fed to an air separator and pressure fluctuation of the compressed air can be reduced.

EMBODIMENTS OF THE INVENTION

The embodiments of the present invention will be described with reference to the drawings.

First Embodiment

Figure 1:
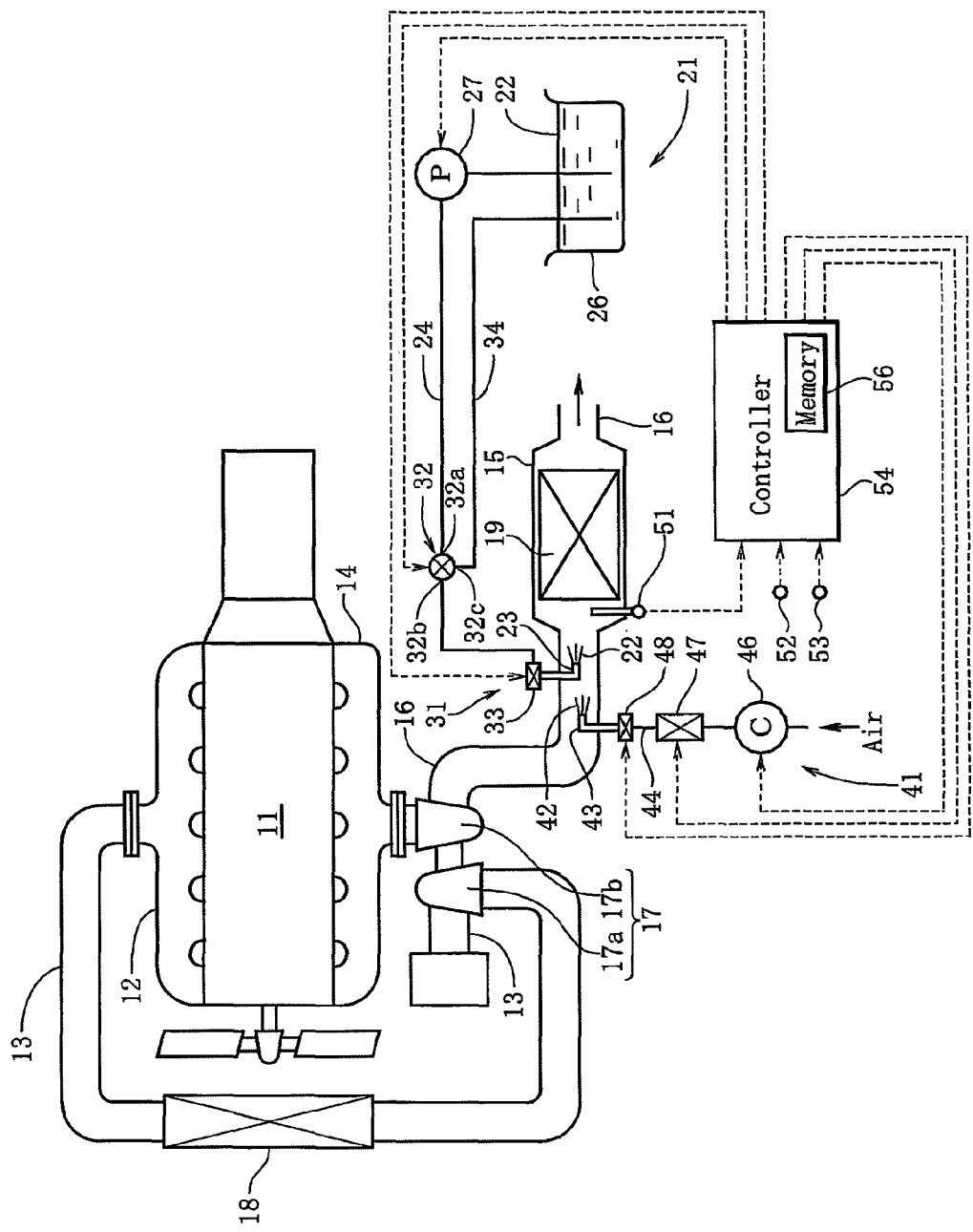
FIG. 1 is a block diagram of an exhaust gas purification device of a first embodiment of the present invention.

As shown in FIG. 1, an intake pipe 13 is connected to an intake port of a diesel engine 11 via an intake manifold 12, and an exhaust pipe 16 is connected to an exhaust port via an exhaust manifold 14. The intake pipe 13 is each provided with a compressor housing 17a of a turbo supercharger 17 and an intercooler 18 that cools intake air compressed by the turbo supercharger 17, and the exhaust pipe 16 is provided with a turbine housing 17b of the turbo supercharger 17. The compressor housing 17a rotatably accommodates a compressor blade (not shown), and the turbine housing 17b rotatably accommodates a turbine blade (not shown). The compressor blade and the turbine blade are linked by a shaft (not shown), and by energy of exhaust gas exhausted from the engine 11, the compressor blade rotates via the turbine blade and the shaft, and the intake air in the intake pipe 13 is compressed by rotation of the compressor blade.

A selective catalytic reduction catalyst 19 is arranged in the middle of an exhaust pipe 16. The selective catalytic reduction catalyst 19 is accommodated in a case 15 whose diameter is larger than the exhaust pipe 16. The selective catalytic reduction catalyst 19 is a monolith catalyst, and it is configured with a cordierite honeycomb carrier coated with zeolite or zirconia. Illustrative example of the zeolite includes copper zeolite, iron zeolite, zinc zeolite and cobalt zeolite. The selective catalytic reduction catalyst 19 composed of copper zeolite is configured with a honeycomb carrier coated with slurry containing a zeolite powder in which cupper is ion-exchanged. The selective catalytic reduction catalyst 19 composed of iron zeolite, zinc zeolite or cobalt zeolite is configured with a honeycomb carrier coated with slurry containing a zeolite powder in which iron, zinc or cobalt is ion-exchanged, respectively. In addition, the selective catalytic reduction catalyst 19 composed of zirconia is configured with a honeycomb carrier coated with slurry containing a γ-alumina powder or a θ-alumina powder carrying zirconia.

Meanwhile, fluid feed means 21 that feeds a urea fluid 22 to the exhaust pipe 16 is arranged in the exhaust pipe 16 on the exhaust gas upstream side from the selective catalytic reduction catalyst 19. The fluid feed means 21 has a fluid injecting nozzle 23 that faces the exhaust pipe 16 on the exhaust gas upstream side from the selective catalytic reduction catalyst 19, a fluid feed pipe 24 whose tip end is connected to the fluid injecting nozzle 23, a tank 26 that stores the urea fluid 22 and is connected to a proximal end of the fluid feed pipe 24, a pump 27 that pumps the urea fluid 22 in the tank 26 to the fluid injecting nozzle 23, and a flow feed rate regulating valve 31 that regulates the amount of the urea fluid 22 supplied (injected) from the fluid injecting nozzle 23. The above urea fluid 22 is any of an ammonia gas or a urea water that functions as a reducing agent in the selective catalytic reduction catalyst 19. The above pump 27 is arranged in the fluid feed pipe 24 between the fluid injecting nozzle 23 and the tank 26, and the flow feed rate regulating valve 31 is arranged in the fluid feed pipe 24 between the fluid injecting nozzle 23 and the pump 27. In addition, the flow feed rate regulating valve 31 comprises a fluid pressure regulating valve 32 that regulates the pressure of the urea fluid 22 supplied to the fluid injecting nozzle 23 arranged in the fluid feed pipe 24, and a fluid opening/closing valve 33 that opens or closes a proximal end of the fluid injecting nozzle 23 arranged at a proximal end of the fluid injecting nozzle 23.

The fluid pressure regulating valve 32 is a three-way valve having first to third ports 32a to 32c. The first port 32a is connected to a discharging port of the pump 27, the second port 32b is connected to the fluid opening/closing valve 33, and the third port 32c is connected to the tank 26 via a return pipe 34. When the fluid pressure regulating valve 32 is driven, the urea fluid 22 pumped by the pump 27 flows from the first port 32a to the fluid pressure regulating valve 32. After the fluid pressure regulating valve 32 regulates the pressure to a specific pressure, the urea fluid 22 is pumped from the second port 32b to the fluid opening/closing valve 33. When the driven fluid pressure regulating valve 32 is stopped, the urea fluid 22 pumped by the pump 27 flows from the first port 32a to the fluid pressure regulating valve 32, and it is returned from the third port 32c to the tank 26 via the return pipe 34.

Meanwhile, the exhaust pipe 16 on the exhaust gas upstream side from the selective catalytic reduction catalyst 19 is provided with ozone feed means 41 that feeds an ozone 42 capable of oxidizing the NO in the exhaust gas to $NO_2$. The ozone feed means 41 has an ozone injecting nozzle 43 that faces the exhaust pipe 16 on the exhaust gas upstream side from the selective catalytic reduction catalyst 19 and on the exhaust gas upstream side from the fluid injecting nozzle 23, an ozone feed pipe 44 whose tip end is connected to the ozone injecting nozzle 43 and whose proximal end is open in the atmosphere, a compressor 46 that pumps the air to the ozone feed pipe 44, an ozone converter 47 that converts part of oxygen contained in the air into the ozone 42, and an ozone feed rate regulating valve 48 that regulates the volume of the ozone 42 supplied (injected) from the ozone injecting nozzle 43. A discharging port of the above compressor 46 is connected to a proximal end of the ozone feed pipe 44, and an intake port of the compressor 46 is open to the atmosphere. In this embodiment, the ozone converter 47 is a silent discharge type. Specifically, the ozone converter 47 is configured such that high-frequency high voltage is impressed between a pair of electrodes arranged (not shown) in parallel with each other at a specific interval and either or both covered with a dielectric to generate plasma arc and to convert part of oxygen contained in the air into the ozone 42 by the plasma arc. The ozone feed rate regulating valve 48 is arranged at a proximal end of the ozone injecting nozzle 43 and is configured such that a proximal end of the ozone injecting nozzle 43 is opened or closed.

A case 15 on the exhaust gas upstream side from the selective catalytic reduction catalyst 19 is provided with a temperature sensor 51 that detects the exhaust gas temperature just before the exhaust gas flows to the selective catalytic reduction catalyst 19. A rotation sensor 52 detects the rotation speed of the engine 11 and a load sensor 53 detects the load of the engine 11. The detected outputs of the temperature sensor 51, the rotation sensor 52 and the load sensor 53 are each connected to the control input of the controller 54, and the control output of the controller 54 are connected to the pump 27, the fluid pressure regulating valve 32, the fluid opening/closing valve 33, the compressor 46, the ozone converter 47 and the ozone feed rate regulating valve 48. The controller 54 is provided with a memory 56. The memory 56 stores the pressure of the fluid pressure regulating valve 32, the number of opening and closing of the fluid opening/closing valve 33 per unit time, whether the pump 27 is actuated or not, the number of opening and closing of the ozone feed rate regulating valve 48 per unit time, and whether the compressor 46 and the ozone converter 47 are actuated or not in compliance with engine rotation speed, engine load, and exhaust gas temperature of a selective catalytic reduction catalyst inlet in advance. The memory 56 stores changes in the flow rates of NO and $NO_2$ in the exhaust gas exhausted from the engine 11 as a map, based on changes in engine rotation speed and engine load. Since the flow ratio of NO to $NO_2$ in the exhaust gas exhausted from the engine varies according to the type of engine, the above map is determined according to the type of engine.

The operation of the exhaust gas purification device thus configured will be described. The exhaust gas temperature soon after the engine 11 is activated and when the engine 11 is in light-load operation is low at 100 to 200° C. In this temperature range, when the temperature sensor 51 detects the exhaust gas temperature, and the rotation sensor 52 and the load sensor 53 detect no-load or light-load operation of the engine 11, the controller 54 drives the compressor 46, the ozone converter 47 and the ozone feed rate regulating valve 48 based on each detected output of the temperature sensor 51, the rotation sensor 52 and the load sensor 53, and also drives the pump 27, the fluid pressure regulating valve 32 and the fluid opening/closing valve 33. When the compressor 46 is driven, air is fed to the ozone converter 47 and the ozone converter 47 converts part of oxygen contained in the air into an ozone 42 by plasma arc. The ozone 42 is intermittently injected (fed) from the ozone injecting nozzle 43 to the exhaust pipe 16 by opening and closing a proximal end of the ozone injecting nozzle 43 by the ozone feed rate regulating valve 48.

Herein, the ozone 42 is fed to the exhaust pipe 16, so that part of NO in the exhaust gas is converted into a highly reactive $NO_2$, and the flow ratio of NO to $NO_2$ in the exhaust gas introduced into the selective catalytic reduction catalyst 19 is set close to 1 to 1, representing reduction reaction of NO and $NO_2$ to $N_2$ proceeds at the fastest rate by the urea fluid 22 in the selective catalytic reduction catalyst 19. Then, the controller 54 calculates the flow ratio of NO to $NO_2$ in the exhaust gas exhausted from the engine 11 based on a map stored in the memory 56, and the feed flow rate to the exhaust pipe 16 of the above ozone 42 is determined, so that the flow ratio of NO to $NO_2$ introduced into the selective catalytic reduction catalyst 19 is made close to 1 to 1. When the above ozone 42 is fed to the exhaust pipe 16, as shown in the following formula (1), part of NO in the exhaust gas is swiftly converted into $NO_2$ by the ozone ($O_3$) 42.

$$O_3 + NO \rightarrow O_2 + NO_2 \tag{1}$$

Meanwhile, when the pump 27 is driven, the fluid pressure regulating valve 32 is driven and the fluid opening/closing valve 33 is opened or closed, the urea fluid 22 is intermittently injected (fed) to the exhaust pipe 16 via the fluid feed pipe 24. Herein, the urea fluid 22 is fed to the exhaust pipe 16, so that it functions as a reducing agent that reduces $NO_x$ in the exhaust gas (NO and $NO_2$) to $N_2$. When NO and $NO_2$ already contained in the exhaust gas exhausted from the engine 11, $NO_2$ generated by oxidizing part of the NO in the exhaust gas by the ozone 42 and the urea fluid 22 are introduced into the selective catalytic reduction catalyst 19, the highly reactive $NO_2$ is subjected to selective reduction reaction with the urea fluid 22 in the selective catalytic reduction catalyst 19 to be reduced to $N_2$, even when the exhaust gas temperature is low at 100 to 200° C. Consequently, $NO_x$ can be efficiently reduced, even when the exhaust gas temperature is low.

A specific chemical reaction in the selective catalytic reduction catalyst 19, if the urea fluid 22 is a urea water, is shown as the following formula (2) or (3), and if the urea fluid 22 is ammonia gas, it is shown as the following formula (4).

$$(NH_2)_2CO + H_2O \rightarrow 2NH_3 + CO_2 \tag{2}$$

$$NO + NO_2 + 2NH_3 \rightarrow 2N_2 + 3H_2O \tag{3}$$

$$NO + NO_2 + 2NH_3 \rightarrow 2N_2 + 3H_2O \tag{4}$$

The above formula (2) represents a chemical reaction formula of hydrolysis of a urea water (urea fluid 22) into ammonia gas, using a relatively small amount of the urea water at the relatively low exhaust gas temperature of at 100 to 200° C. The above formula (3) represents a chemical reaction formula of reduction of NO and $NO_2$ to $N_2$ after NO and $NO_2$ in the exhaust gas react with ammonia gas hydrolyzed from the above urea water in the selective catalytic reduction catalyst 19. Moreover, the above formula (4) represents a chemical reaction formula of reduction of NO and $NO_2$ to $N_2$ after NO and $NO_2$ in the exhaust gas react with ammonia gas (urea fluid 22) in the selective catalytic reduction catalyst 19. Herein, ammonia gas is preferably used as the urea fluid 22 because the ammonia gas can generate more swift reduction reaction of NO and $NO_2$ to $N_2$. If a urea water is used as the urea fluid 22, it is preferable that the urea water be heated to 200° C. or more to be dissolved into ammonia gas and fed to the exhaust pipe 16 to generate more swift reduction reaction of NO and $NO_2$ to $N_2$.

When the exhaust gas temperature exceeds 200° C., the controller 54 stops the drive of compressor 46, the ozone converter 47 and the ozone feed rate regulating valve 48 based on the detected output of the temperature sensor 51. This operation represents that if the exhaust gas temperature is relatively high, $NO_x$ in the exhaust gas reacts with the urea fluid 22 in the selective catalytic reduction catalyst 19 to swiftly reduce $NO_x$ and $NO_2$ to $N_2$, even when the flow ratio of NO to $NO_2$ in the exhaust gas does not come close to 1 to 1.

Second Embodiment

Figure 2:
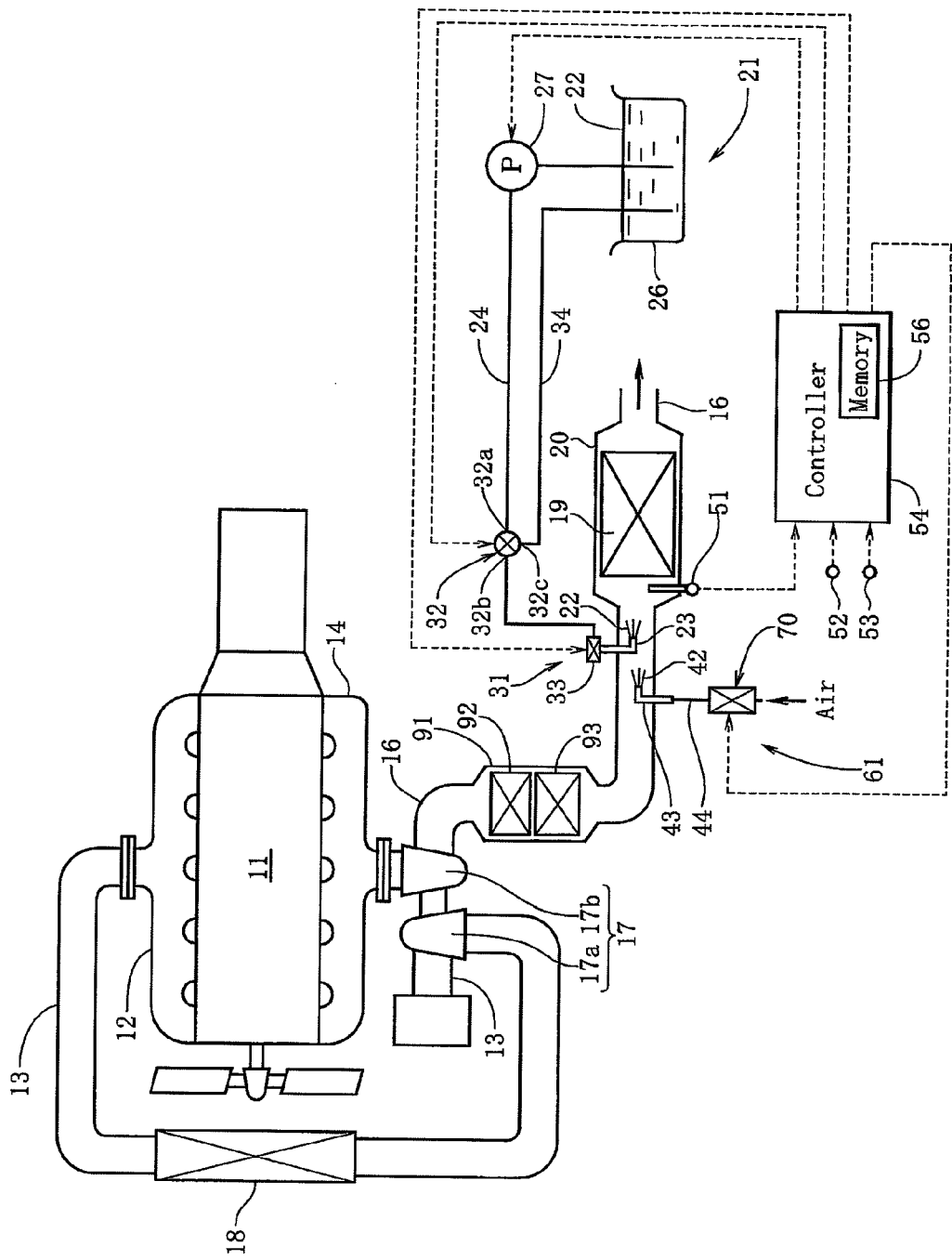
FIG. 2 is a block diagram indicative of an exhaust gas purification device of a second embodiment of the present invention.

FIGS. 2 to 7 show a second embodiment of the present invention. The numbered components in FIG. 2 are the same as the numbered components in FIG. 1. In this embodiment, an exhaust pipe 16 on the exhaust gas upstream side from a selective catalytic reduction catalyst 19 is provided with ozone feed means 61 that feeds an ozone capable of oxidizing the NO in the exhaust gas to $NO_2$ to the exhaust pipe 16. The ozone feed means 61 has an ozone injecting nozzle 43 that faces the exhaust pipe 16 on the exhaust gas upstream side from the selective catalytic reduction catalyst 19 and on the exhaust gas upstream side from the fluid injecting nozzle 23, and an ozone generator 70 connected to an ozone injecting nozzle 43 via an ozone feed pipe 44. The ozone generator 70 is configured such that an ozone 42 is generated using oxygen in the air.

Figure 3:
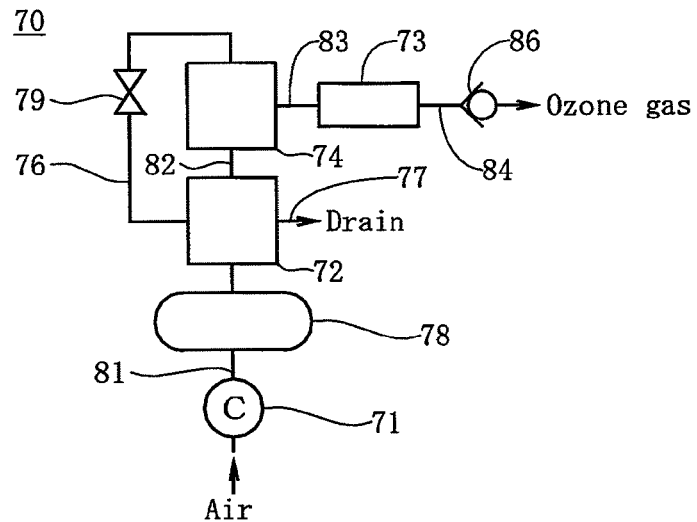
FIG. 3 is a pneumatic circuit block diagram of an ozone generator used in an exhaust gas purification device of a second embodiment of the present invention.
Figure 4:
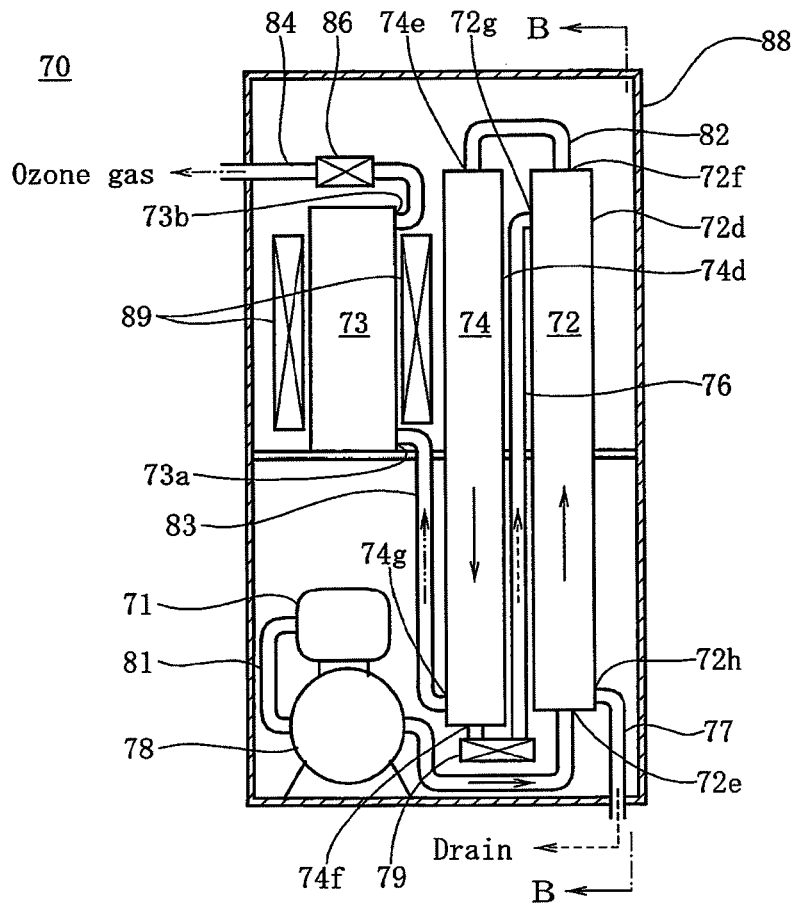
FIG. 4 is a sectional view of an ozone generator of a second embodiment of the present invention taken along the line A-A of FIG. 5.
Figure 5:
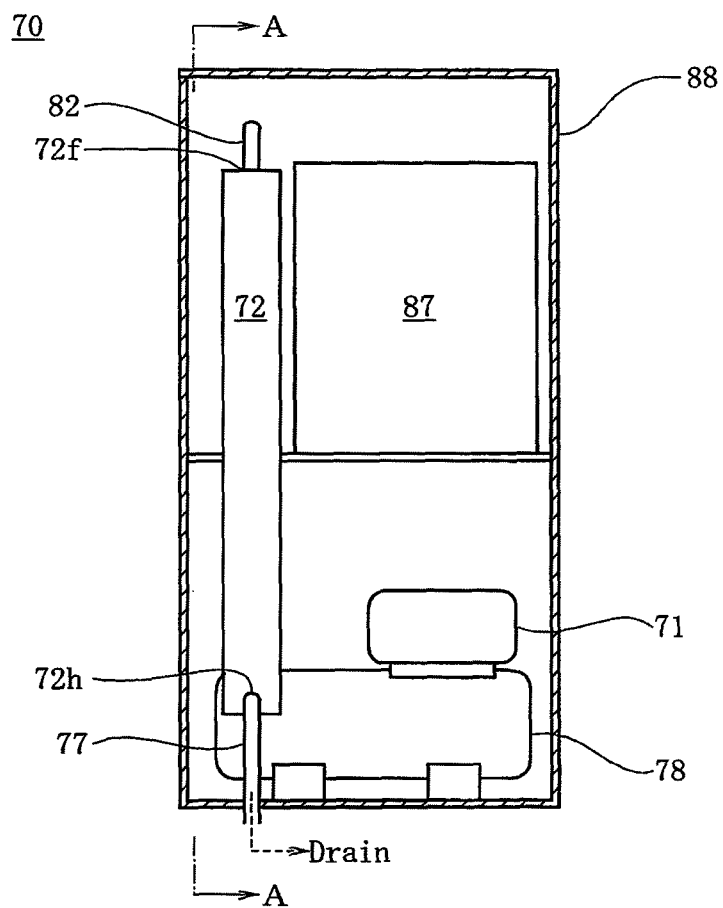
FIG. 5 is a sectional view of an ozone generator of a second embodiment of the present invention taken along the line B-B of FIG. 4.
Figure 6:
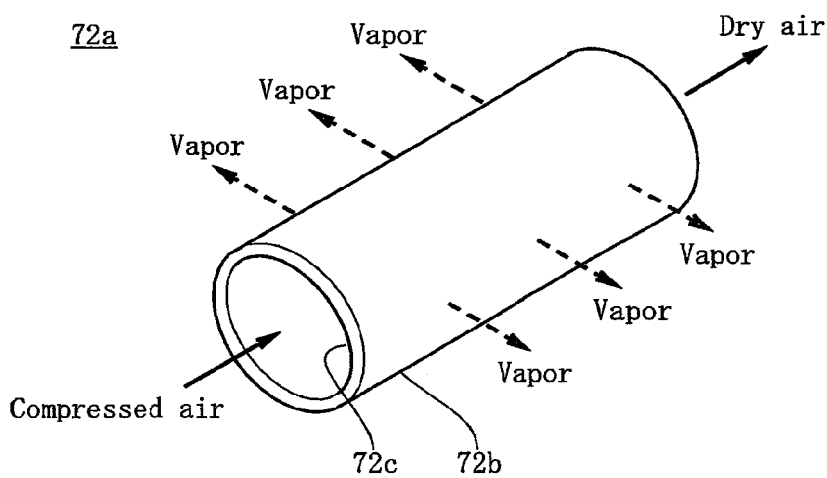
FIG. 6 is an enlarged cross sectional view of main parts of a hollow fiber composed of a steam separating membrane of a drier of the ozone generator.
Figure 7:
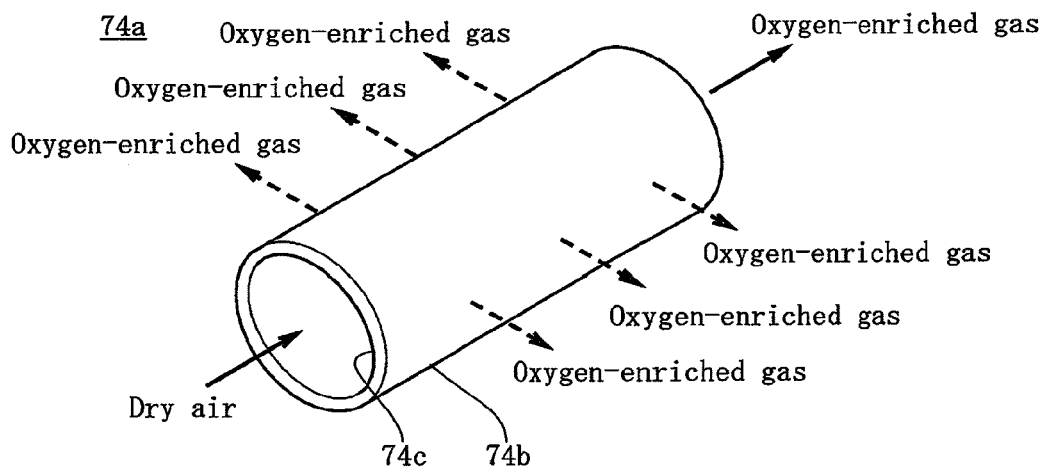
FIG. 7 is an enlarged cross sectional view of main parts of a hollow fiber composed of an oxygen-enriched membrane of an air separator.

The above ozone generator 70, as shown in FIGS. 3 to 5, has a compressor 71 that compresses the air, a drier 72 that dries compressed air compressed by the compressor 71, and an ozone converter 73 that converts part of oxygen in the compressed air dried by the drier 72. In this embodiment, the compressor 71 is configured such that it is driven by a battery with a direct-current voltage of 24V. The compressor is driven by a battery with a direct-current voltage of 24V in this embodiment, however the compressor may be driven by a crankshaft of an engine, or by a battery with a direct-current voltage of 200 to 300V for a hybrid vehicle.

The drier 72 is configured by housing a steam separating membrane 72a that readily transmits vapor (moisture) and hardly transmits the air (FIG. 6) in a tubular housing 72d. The steam separating membrane 72a is formed by bunching an asymmetric hollow fiber 72b of an aromatic polyimide having a membrane thickness of 100 μm, an outer diameter of 500 μm and a length of 450 mm (a hollow fiber 72b whose center includes an aperture 72c having an asymmetric coarse and dense structure in the membrane thickness direction), and it is accommodated in the housing 72d in a longitudinally extended manner (FIGS. 3 to 5). The housing 72d is provided on an under surface with an air intake port 72e that introduces the air compressed by the compressor 71, and the housing 72d is provided on an upper surface with an air exhaust port 72f that exhausts compressed air dried by the drier 72 (FIG. 4). The air intake port 72e is connected to a lower end of each hollow fiber 72b of the steam separating membrane 72a, and the air exhaust port 72f is connected to an upper end of each hollow fiber 72b of the steam separating membrane 72a, thereby making the air intake port 72e and the air exhaust port 72f communicate with the aperture 72c of each hollow fiber 72b. In addition, the housing 72d is provided at the upper part of a side wall with a purge gas intake port 72g that introduces a later-mentioned nitrogen-enriched gas as a purge gas, and the housing 72d is provided at the lower part of a side wall with a purge gas exhaust port 72h for exhausting the nitrogen-enriched gas as a purge gas together with vapor (moisture). The nitrogen-enriched gas introduced from the purge gas intake port 72g is exhausted from the purge gas exhaust port 72h through an outer peripheral surface of the hollow fiber 72b of the steam separating membrane 72a.

Herein, when compressed air containing vapor (moisture) flows through the aperture 72c of each hollow fiber 72b of the steam separating membrane 72a (inner diameter of the aperture 72c is formed to be e.g. 300 μm.), vapor in the compressed air flowing through the aperture 72c transmits from an inner surface of a membrane of the hollow fiber 72b having a high vapor partial pressure to an outer surface of a membrane of the hollow fiber 72b having a low vapor partial pressure by a different vapor partial pressure between the inner surface and the outer surface of a membrane of the hollow fiber 72b as a driving force. Thus, the vapor in the compressed air flowing through the aperture 72c of the hollow fiber 72b is reduced to exhaust dry compressed air from the air exhaust port 72f.

In this embodiment, an ozone converter 73 is a silent discharge type (FIGS. 3 and 4). Specifically, the ozone converter 73 is configured such that high-frequency high voltage is impressed between a pair of electrodes arranged (not shown) in parallel with each other at a specific interval and either or both covered with a dielectric to generate plasma arc and to convert part of oxygen contained in the air into the ozone 42 by the plasma arc.

Meanwhile, an air separator 74 is arranged between the drier 72 and the ozone converter 73 (FIGS. 3 and 4). The air separator 74 is configured by housing an oxygen-enriched membrane 74a (FIG. 7) having a property of transmitting oxygen gas more easily than nitrogen gas in the air in a tubular housing 74d. The oxygen-enriched membrane 74a is configured so as to separate compressed air dried by the drier 72 into an oxygen-enriched gas having a high oxygen concentration and a nitrogen-enriched gas having a high nitrogen concentration. Specifically, the oxygen-enriched membrane 74a is formed by bunching a hollow fiber 74b composed of polymers that selectively transmits oxygen gas compared to nitrogen gas having an aperture 74c in the middle thereof and is accommodated in a housing 74d in a longitudinally extended manner. The hollow fiber 74b configuring the oxygen-enriched membrane 74a is preferably formed with glassy polymers whose degree of separation of oxygen gas and nitrogen gas is large, and more preferably formed with polyimides whose degree of separation of oxygen gas and nitrogen gas is particularly large having excellent mechanical strength, heat resistance and endurance. Also, a membrane of the hollow fiber 74b configuring the oxygen-enriched membrane 74a may be a uniform membrane having a uniform density in the membrane thickness direction, or a composite membrane formed having an non-uniform density in the membrane thickness direction by inserting a plurality of hollow fibers having different inner diameters, outer diameters and densities, but preferably an asymmetric membrane having a high transmission rate by having a asymmetric coarse and dense structure in the membrane thickness direction. In addition, it is preferable that the membrane thickness of the hollow fiber 74b range from 10 μm to 500 μm, and the outer diameter of the hollow fiber 74b range from 50 μm to 2000 μm.

The housing 74d that accommodates the oxygen-enriched membrane 74a is provided on an upper surface with a dry air intake port 74e that introduces compressed air dried by the drier 72, and the housing 74d is provided on an under surface with a nitrogen-enriched gas exhaust port 74f that exhausts a nitrogen-enriched gas separated by the air separator 74 (FIG. 4). The dry air intake port 74e is connected to an upper end of each hollow fiber 74b of the oxygen-enriched membrane 74a, and the nitrogen-enriched gas exhaust port 74f is connected to a lower end of each hollow fiber 74b of the oxygen-enriched membrane 74a, thereby making the dry air intake port 74e and the nitrogen-enriched gas exhaust port 74f communicate with the aperture 74c of each hollow fiber 74b. The housing 74d that accommodates the oxygen-enriched membrane 74a is provided at the lower part of a side wall with an oxygen-enriched gas exhaust port 74g that exhausts an oxygen-enriched gas. By making the oxygen-enriched gas pass through a membrane of the hollow fiber 74b of the oxygen-enriched membrane 74a, the oxygen-enriched gas having a high oxygen concentration is exhausted from the oxygen-enriched gas exhaust port 74g.

Herein, the principle of separation into the oxygen-enriched gas having a high oxygen concentration and the nitrogen-enriched gas having a high nitrogen concentration by the oxygen-enriched membrane 74a will be described. When dry compressed air flows through the aperture 74c of each hollow fiber 74b of the oxygen-enriched membrane 74a, a membrane of the hollow fiber 74b is subjected to thermal vibration to form a gap for gas to pass through, thereby introducing an oxygen molecule and a nitrogen molecule in compressed air into the above gap. The thickness of the oxygen-enriched membrane 74a is formed relatively low, and the speed of an oxygen molecule to transmit through a membrane of the hollow fiber 74b is about 2.5 times the speed of a nitrogen molecule to transmit through a membrane of the hollow fiber 74b. Therefore, an oxygen molecule swiftly transmits from an inner surface of a membrane of the hollow fiber 74b having a high partial pressure to an outer surface of the hollow fiber 74b having a low partial pressure. Consequently, the oxygen concentration on the outer surface side of the membrane of the hollow fiber 74b becomes higher, and the oxygen concentration on the inner surface side of the membrane of the hollow fiber 74b becomes lower. As a result, the oxygen-enriched gas is generated when the compressed air passes through the oxygen-enriched membrane 74a, and the nitrogen-enriched gas is generated when the compressed air does not pass through the oxygen-enriched membrane 74a. The size of a gap formed on a membrane of the hollow fiber 74b by the above thermal vibration is approximately 5 nm.

Meanwhile, a discharging port of the compressor 71 is connected to the air intake port 72e of the drier 72 by a first feed pipe 81, and the air exhaust port 72f of the drier 72 is connected to the dry air intake port 74e of the air separator 74 by a second feed pipe 82 (FIGS. 3 to 5). The oxygen-enriched gas exhaust port 74g of the air separator 74 is connected to the oxygen-enriched gas intake port 73a of the ozone converter 73 by a third feed pipe 83, and one end of a fourth feed pipe 84 is connected to the ozone exhaust port 73b of the ozone converter 73. Also, the nitrogen-enriched gas exhaust port 74f of the air separator 74 is connected to the purge gas intake port 72g of the drier 72 by a purge pipe 76, and one end of a drain pipe 77 is connected to a purge gas exhaust pipe 72h of the drier 72. Moreover, the first feed pipe 81 is provided with an air tank 78 that stores compressed air compressed by the compressor 71, and the purge pipe 76 is provided with a flow regulating valve 79 that regulates the flow rate of the nitrogen-enriched gas passing through the purge pipe 76. The above air tank 78 is arranged to feed a sufficient amount of compressed air to the air separator 74 and to reduce pressure fluctuation of the compressed air, even when the flow rate of the oxygen-enriched gas and the nitrogen-enriched gas is fluctuated. No. 86 component in FIGS. 3 and 4 represents a check valve arranged in the fourth feed pipe 84. The check valve 86 is configured to allow the flow of ozone gas from the ozone converter 73 to a later-mentioned ozone injecting nozzle 43 and prevent the flow of ozone gas from the ozone injecting nozzle 43 to the ozone converter 73. No. 87 component in FIG. 5 represents a high voltage power supply that supplies power to the ozone converter 73, and No. 88 component in FIGS. 4 and 5 represents a casing that accommodates each member of the ozone generator 70. Moreover, No. 89,89 components in FIG. 4 each represent a fan that cools the ozone converter 73.

Back to FIG. 2, the exhaust pipe 16 on the exhaust gas upstream side from the ozone injecting nozzle 43 is provided with a case 91, and the case 91 accommodates an oxidation catalyst 92 and a particulate filter 93 in series from the exhaust gas upstream side. The oxidation catalyst 92 is a monolith catalyst, and configured by coating a honeycomb carrier made of cordierite with a noble metal catalyst such as platinum zeolite, platinum alumina, or platinum-palladium alumina. Specifically, the oxidation catalyst 92 made of platinum zeolite is configured by coating a honeycomb carrier with slurry containing a zeolite powder having ion-exchanged platinum. The oxidation catalyst 92 made of platinum alumina is configured by coating a honeycomb carrier with slurry containing a γ-alumina powder or a θ-alumina powder carrying platinum. In addition, the oxidation catalyst 92 made of platinum-palladium alumina is configured by coating a honeycomb carrier with slurry containing a γ-alumina powder or a θ-alumina powder carrying platinum and palladium. The above oxidation catalyst 92 is configured such that the NO in the exhaust gas is oxidized to $NO_2$ at a specific exhaust gas temperature or more. Herein, the specific exhaust gas temperature ranges from 160 to 200° C., preferably 170 to 190° C., and more preferably is 180° C. The specific exhaust gas temperature varies in this manner, because the activity temperature (oxidation initiation temperature of NO to $NO_2$) is different according to the type of noble metal with which the honeycomb carrier of the oxidation catalyst 92 is coated.

The particulate filter 93 has a polygonal section (not shown) divided by a porous bulkhead made of ceramics such as cordierite. The filter 93 is configured such that mutually adjacent inlet and outlet of many through-holes formed in parallel each other by these bulkheads are alternately sealed with sealing members. In this filter 93, when the exhaust gas of the engine 11 introduced from the inlet of the filter 93 passes through the porous bulkheads, particulates contained in the exhaust gas are trapped and exhausted from the outlet.

Meanwhile, each detected output of the temperature sensor 51, the rotation sensor 52 and the load sensor 53 is connected to control input of the controller 54, and control output of the controller 54 is connected to the high voltage power supply 87, the nitrogen-enriched gas flow regulating valve 79, the ozone converter 73, the pump 27, the fluid pressure regulating valve 32, and the fluid opening/closing valve 33 respectively. The controller 54 is provided with a memory 56. The memory 56 stores whether the compressor 71 is activated or not, the opening degree of the nitrogen-enriched gas flow regulating valve 79, whether the ozone converter 73 driven by the high voltage power supply 87 is activated or not, whether the pump 27 is activated or not, the opening degree of the fluid pressure regulating valve 32, and the number of opening and closing of the fluid opening/closing valve 33 per unit time in advance in compliance with engine rotation speed, engine load, and exhaust gas temperature at the inlet of the selective catalytic reduction catalyst 19. The memory 56 also stores changes in flow rates of NO and $NO_2$ in the exhaust gas exhausted from the engine 11 as a map based on changes in engine rotation speed and engine load. Since the flow ratio of NO to $NO_2$ in the exhaust gas exhausted from the engine 11 varies according to the type of the engine 11, the above map is changed according to the type of the engine 11.

The operation of the exhaust gas purification device thus configured will be described. Soon after the engine 11 is activated or when the engine 11 is operated in light load, the exhaust gas temperature is low at under 180° C. Herein, the exhaust gas temperature is set at under 180° C., because if it is 180° C. or more, the oxidation catalyst 92 will be activated, thereby oxidizing the NO in the exhaust gas to $NO_2$ by the oxidation catalyst 92, even if ozone gas is not fed to the exhaust pipe 16. Thus, the above temperature of 180° C. is defined as one example. If the type of noble metal with which a honeycomb carrier of the oxidation catalyst 92 is coated is changed, the above temperature needs changing, but the temperature is set to be a specific temperature ranging from 160 to 200° C., and preferably from 170 to 190° C. When the temperature sensor 51 detects that the exhaust gas temperature is low at under 180° C., and the rotation sensor 52 and the load sensor 53 detect non-load operation or light-load operation of the engine 11, the controller 54 drives the compressor 71, opens the nitrogen-enriched gas flow regulating valve 79 with a specific opening degree, activates the ozone converter 73 by the high voltage power supply 87, drives the pump 27, opens the fluid pressure regulating valve 32 with a specific opening degree and opens or closes the fluid opening/closing valve 33, based on each detected output of the temperature sensor 51, the rotation sensor 52 and the load sensor 53. When the compressor 71 is driven, the air is compressed and stored in the air tank 78. The drier 72 removes vapor (moisture) from the compressed air to make the compressed air dry. The dry compressed air is separated into an oxygen-enriched gas having a high oxygen concentration and a nitrogen-enriched gas having a high nitrogen concentration by the air separator 74. The oxygen-enriched gas separated by the air separator 74 is fed to the ozone converter 73 to convert part of oxygen in the oxygen-enriched gas into ozone by the ozone converter 73. The ozone gas is fed to the ozone injecting nozzle 43 through the fourth feed pipe 84 and the ozone feed pipe 44. Meanwhile, the nitrogen-enriched gas separated by the air separator 74 passes through the purge pipe 76 to be fed to the drier 72, and is exhausted from the drain pipe 77 together with vapor (moisture) separated by the drier 72. In this way, since the drier 72 is recycled by using a nitrogen-enriched gas not necessary for generating ozone, not by using an oxygen-enriched gas necessary for generating ozone, the drier 72 can be efficiently recycled. Since it is not necessary to directly use the air compressed by the compressor 71 to recycle the drier 72, the consumption of the air compressed by the compressor 71 can be suppressed. Consequently, the delivery capacity of the compressor 71 can be reduced to make the compressor 71 smaller in size.

If the amount of the oxygen-enriched gas increases, vapor content (moisture content) in compressed air removed in the drier 72 increases. In this case, however, since the nitrogen-enriched gas separated by the air separator 74 increases in order to widen the opening degree of the nitrogen-enriched gas flow regulating valve 79, vapor (moisture) increased in the drier 72 derived from the increase in the nitrogen-enriched gas can be removed. Consequently, the nitrogen-enriched gas increases or decreases in accordance with increase or decrease in the oxygen-enriched gas, thereby efficiently recycling the drier 72. Also, since it is not necessary to use a regulator that regulates the pressure of the compressed air compressed by the compressor 71, the ozone generator 70 can be configured with a relatively small number of components, and the flow passage resistance of the compressed air can be reduced, thereby making the compressor 71 much smaller in size. In addition, regardless of whether a hydrocarbon which is found in the compressed air compressed by compressor 71 adheres to the oxygen-enriched membrane 74a or not, the oxygen-enriched gas and the nitrogen-enriched gas can be assuredly separated by the oxygen-enriched membrane 74a. Consequently, regardless of whether the hydrocarbon adheres to the oxygen-enriched membrane 74a or not, a separating function of the oxygen-enriched gas and the nitrogen-enriched gas by the oxygen-enriched membrane 74a cannot be reduced.

Meanwhile, ozone gas fed to the ozone injecting nozzle 43 is injected (fed) from the ozone injecting nozzle 43 to the exhaust pipe 16. Herein, the ozone gas is fed to the exhaust pipe 16 to convert part of NO in the exhaust gas into a highly reactive $NO_2$ by the ozone gas and to make the flow ratio of NO to $NO_2$ in the exhaust gas introduced into the selective catalytic reduction catalyst 19 come close to 1 to 1, representing reduction reaction of NO and $NO_2$ by a urea fluid 22 in the selective catalytic reduction catalyst 19 to $N_2$ proceeds the fastest. Then, the controller 54 calculates the flow ratio of NO to $NO_2$ in the exhaust gas exhausted from the engine 11, based on a map stored in the memory 56, and determines the flow rate of the above ozone gas fed to the exhaust pipe 16, so that the flow ratio of NO to $NO_2$ introduced into the selective catalytic reduction catalyst 19 comes close to 1 to 1. When the above ozone gas is fed to the exhaust pipe 16, as shown in the formula (1) of the first embodiment, part of NO in the exhaust gas is swiftly converted into $NO_2$ by ozone ($O_3$).

Meanwhile, when the pump 27 is driven, the fluid pressure regulating valve 32 is opened with a specific opening degree, and when the fluid opening/closing valve 33 is opened or closed, the urea fluid 22 passes through the fluid feed pipe 24 to be intermittently injected (fed) to the exhaust pipe 16. Herein, the urea fluid 22 is fed to the exhaust pipe 16 to function as a reducing agent that reduces $NO_x$ in the exhaust gas (NO and $NO_2$) to $N_2$. When NO and $NO_2$ already contained in the exhaust gas exhausted from the engine 11, $NO_2$ generated by oxidizing part of the NO in the exhaust gas by the ozone, and the urea fluid 22 are introduced into the selective catalytic reduction catalyst 19, a highly reactive $NO_2$ is subjected to selective reduction reaction with the urea fluid 22 in the selective catalytic reduction catalyst 19 to be reduced to $N_2$, even when the exhaust gas temperature is low at under 180° C. Consequently, $NO_x$ can be efficiently reduced, even when the exhaust gas temperature is low. The oxidation catalyst 92 is not activated when the exhaust gas temperature is low at under 180° C., and a function of oxidizing the NO to $NO_2$ is not provided.

A specific chemical reaction in the selective catalytic reduction catalyst 19 is shown in the formulas (2) and (3) of the first embodiment when the urea fluid 22 is a urea water. A specific chemical reaction in the selective catalytic reduction catalyst 19 is shown in the formula (4) of the first embodiment when the urea fluid 22 is ammonia gas.

When the exhaust gas temperature is 180° C. or more, the controller 54 stops the driving of the compressor 71 and the ozone converter 73, based on a detected output of the temperature sensor 51, and closes the nitrogen-enriched gas flow regulating valve 79. This is because the oxidation catalyst 92 is activated to oxidize the NO to $NO_2$ when the exhaust gas temperature is relatively high. In other words, when the exhaust gas temperature is 180° C. or more, the oxidation catalyst 92 oxidizes the NO in the exhaust gas to a highly reactive $NO_2$, so the highly reactive $NO_2$ flows into the selective catalytic reduction catalyst 19 together with the urea fluid 22 fed from the fluid injecting nozzle 23 of the fluid feed means 21 to exhaust pipe 16. Consequently, even when the exhaust gas temperature is high, the highly reactive $NO_2$ is subjected to selective reduction reaction with the urea fluid 22 in the selective catalytic reduction catalyst 19 to be reduced to $N_2$. Thus, $NO_x$ can be efficiently reduced, even when the exhaust gas temperature is high. Therefore, $NO_x$ can be efficiently reduced within almost all exhaust gas temperature ranges.

In the above first and second embodiments, the exhaust gas purification device of the present invention is applied to a diesel engine, but may be applied to a gasoline engine. Also, in the above first and second embodiments, the exhaust gas purification device of the present invention is applied to a diesel engine having a turbo supercharger, but may be applied to a natural aspiration type diesel engine or a natural aspiration type gasoline engine. In the above first and second embodiments, an ozone converter is used as a silent discharge type, but may be used as a surface discharge type, an ozone generating type by radiating ultraviolet to the air, or an ozone generating type by electrolysis of water. In addition, in the above second embodiment, an air tank is arranged between a compressor and a drier, but when the flow rate of an oxygen-enriched gas and a nitrogen-enriched gas does not fluctuate, it is not necessary to install an air tank.

EXAMPLE

Examples of the present invention will be described in more detail together with Comparative Examples.

Example 1

As shown in FIG. 1, a selective catalytic reduction catalyst 19 was arranged to an exhaust pipe 16 of a diesel engine 11 having a turbo supercharger having six cylinders in series (engine displacement: 8000 cc). An exhaust pipe 16 on the exhaust gas upstream side from the selective catalytic reduction catalyst 19 was provided with a fluid injecting nozzle 23 that feeds a urea water 22. Herein, the selective catalytic reduction catalyst 19 was a copper-based catalyst produced by coating a honeycomb carrier with slurry containing a zeolite powder in which cupper is ion-exchanged. An exhaust pipe 16 on the exhaust gas upstream side from the fluid injecting nozzle 23 was provided with an ozone injecting nozzle 43 that feeds an ozone 42. Herein, the urea water 22 injected from the fluid injecting nozzle 23, whose amount is equivalent to 200 ppm in terms of ammonia (hydrolyzing amount to ammonia gas based on reaction of the above formula (2) of the urea water 22) was injected (fed), and the amount of the ozone 42 injected (fed) from the ozone injecting nozzle 43 was 30 ppm. The exhaust gas purification device is defined as Example 1.

Example 2

The exhaust gas purification device is configured same as Example 1 except that the amount of ozone injected (fed) from the ozone injecting nozzle is 55 ppm. The exhaust gas purification device is defined as Example 2.

Example 3

The exhaust gas purification device is configured same as Example 1 except that ammonia gas is injected from the fluid injecting nozzle and the amount of ozone injected (fed) from the fluid injecting nozzle is 200 ppm. The exhaust gas purification device is defined as Example 3.

Example 4

The exhaust gas purification device is configured same as Example 3 except that the amount of ozone injected (fed) from the ozone injecting nozzle is 55 ppm. The exhaust gas purification device is defined as Example 4.

Comparative Example 1

The exhaust gas purification device is configured same as Example 1 except that ozone was not injected from the ozone injecting nozzle. The exhaust gas purification device is defined as Comparative Example 1.

Comparative Example 2

The exhaust gas purification device is configured same as Example 3 except that ozone was not injected from the ozone injecting nozzle. The exhaust gas purification device is defined as Comparative Example 2.

<Comparative Test 1 and Evaluation>

By changing the rotation speed and the load of the engine, $NO_x$ reduction ratio was measured when the temperature of the exhaust gas exhausted from the exhaust pipes of the engines of Example 1 to 4 and Comparative Examples 1 and 2 was slowly increased from 100° C. to 200° C. The results are shown in FIGS. 8 and 9.

Figure 8:
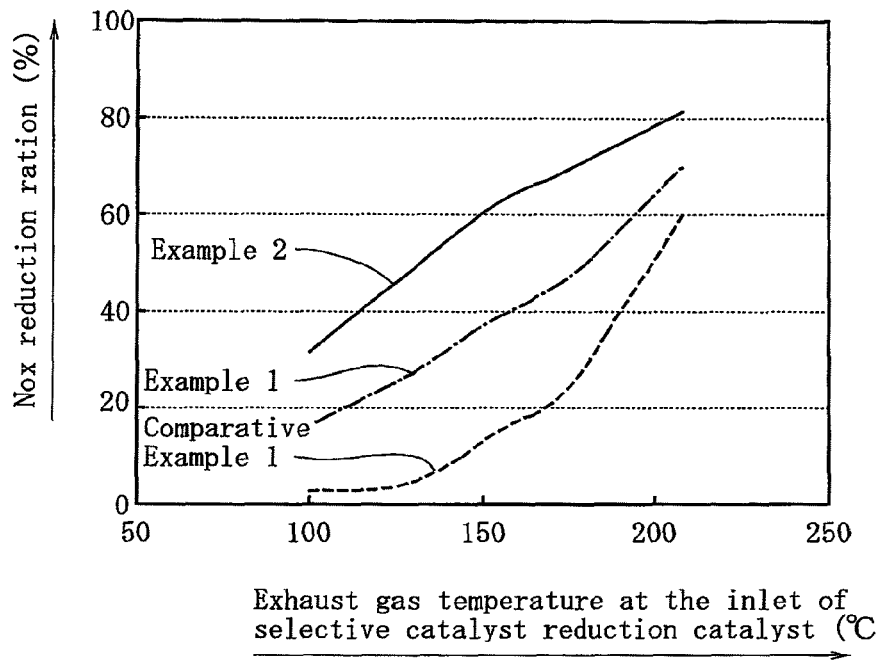
FIG. 8 is a figure indicative of a change in $NO_x$ reduction ratio in response to a change in the exhaust gas temperature, using the exhaust gas purification devices of Examples 1 and 2 and Comparative Example 1 in which a urea fluid is a urea water and the amount of ozone added is changed.

As clearly shown in FIG. 8, in the exhaust gas purification device of Comparative Example 1, $NO_x$ reduction ratio at 100° C. and 200° C. were approximately 3% and 60% respectively, but in the exhaust gas purification device of Example 1, $NO_x$ reduction ratio at 100° C. and 200° C. were higher at approximately 17% and 70% respectively. In the exhaust gas purification device of Example 2, $NO_x$ reduction ratio at 100° C. and 200° C. were much higher at approximately 30% and 80% respectively. In other words, the exhaust gas purification device of Example 1 in which 30 ppm ozone was fed shows a more improvement in $NO_x$ reduction ratio at the exhaust gas temperature ranging from 100 to 200° C. than the exhaust gas purification device of Comparative Example 1 in which ozone was not fed. The exhaust gas purification device of Example 2 in which 55 ppm ozone was fed shows a more improvement in $NO_x$ reduction ratio at the exhaust gas temperature ranging from 100 to 200° C. than the exhaust gas purification device of Example 1 in which 30 ppm ozone was fed. Herein, this is because the flow ratio of NO to $NO_2$ introduced into the selective catalytic reduction catalyst comes close to 1 to 1 representing that reduction reaction to $N_2$ proceeds more swiftly in Example 1 than Comparative Example 1 and comes much closer to 1 to 1 representing that reduction reaction to $N_2$ proceeds more swiftly in Example 2 than Example 1.

Figure 9:
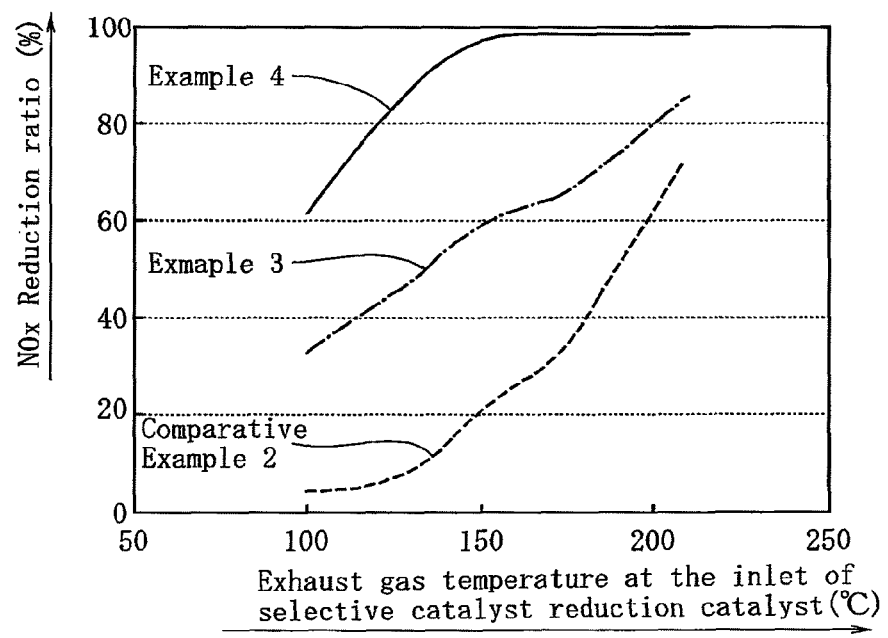
FIG. 9 is a figure indicative of a change in $NO_x$ reduction ratio in response to a change in the exhaust gas temperature, using the exhaust gas purification devices of Examples 3 and 4 and Comparative Example 2 in which a urea fluid is ammonia gas and the amount of ozone added is changed.

As clearly shown in FIG. 9, in the exhaust gas purification device of Comparative Example 2, $NO_x$ reduction ratio at 100° C. and 200° C. were approximately 4% and 70% respectively, but in the exhaust gas purification device of Example 3, $NO_x$ reduction ratio at 100° C. and 200° C. were higher at approximately 33% and 86% respectively. In the exhaust gas purification device of Example 4, $NO_x$ reduction ratio at 100° C. and 200° C. were much higher at approximately 60% and 99% respectively. In other words, the exhaust gas purification device of Example 3 in which 30 ppm ozone was fed shows a more improvement in $NO_x$ reduction ratio at the exhaust gas temperature ranging from 100 to 200° C. than the exhaust gas purification device of Comparative Example 2 in which ozone was not fed. The exhaust gas purification device of Example 4 in which 55 ppm ozone was fed shows a more improvement in $NO_x$ reduction ratio at the exhaust gas temperature ranging from 100 to 200° C. than the exhaust gas purification device of Example 3 in which 30 ppm ozone was fed. Herein, this is because the flow ratio of NO to $NO_2$ introduced into the selective catalytic reduction catalyst comes close to 1 to 1 representing that reduction reaction to $N_2$ proceeds more swiftly in Example 3 than Comparative Example 2 and comes much closes to 1 to 1 representing that reduction reaction to $N_2$ proceeds more swiftly in Example 4 than Example 3.

As clearly shown in FIGS. 8 and 9, the exhaust gas purification devices of Example 3, Example 4 and Comparative Example 2 in which ammonia gas was fed to selective catalytic reduction catalyst shows a more improvement in $NO_x$ reduction ratio at the exhaust gas temperature ranging from 100 to 200° C. than the exhaust gas purification devices of Example 1, Example 2 and Comparative Example 1 in which a urea water was fed to the selective catalytic reduction catalyst. Herein, this is because that feeding ammonia gas to the selective catalytic reduction catalyst shows more swift reduction reaction of NO and $NO_2$ to $N_2$ than feeding a urea water to the selective catalytic reduction catalyst.

Example 5

As shown in FIG. 2, an exhaust pipe 16 of a diesel engine 11 having a turbo supercharger 17 having six cylinders in series (engine displacement: 8000 cc) is provided with a selective catalytic reduction catalyst 19. The exhaust pipe 16 on the exhaust gas upstream side from the selective catalytic reduction catalyst 19 is provided with a fluid injecting nozzle 23 that feeds a urea water. Herein, the selective catalytic reduction catalyst 19 is a copper-based catalyst produced by coating a honeycomb carrier with slurry containing a zeolite powder in which copper is ion-exchanged. The exhaust pipe 16 on the exhaust gas upstream side from the fluid injecting nozzle 23 is provided with an ozone injecting nozzle 43 that feeds an ozone gas. A tip end of an ozone feed pipe 44 is connected to the ozone injecting nozzle 43, and a proximal end of the ozone feed pipe 44 is connected to a fourth feed pipe 84 of an ozone generator 70. The ozone generator 70, as shown in FIGS. 3 to 5, has a compressor 71, an air tank 78, a drier 72, an air separator 74, an ozone converter 73, a flow regulating valve 79, a check valve 86, and a high voltage power supply 87. The compressor 71 is driven by a battery with a direct current of 24V. The drier 72 is a "UBE membrane drier" from Ube Industries Ltd., and the air separator 74 is a "UBE $N_2$ separator" from Ube Industries Ltd. Herein, a urea water injected from the fluid injecting nozzle 23 whose amount is equivalent to 200 ppm in terms of ammonia (hydrolyzing amount to ammonia gas based on reaction of the above formula (2) of urea water) is injected (fed), and the amount of ozone gas injected (fed) from the ozone injecting nozzle 43 was 30 ppm. The exhaust pipe 16 on the exhaust gas upstream side from the fluid injecting nozzle 23 and the ozone injecting nozzle 43 is provided with an oxidation catalyst 92 and a particulate filter 93 in series from the exhaust gas upstream side. Herein, the oxidation catalyst 92 is a platinum-based catalysts produced by coating a honeycomb carrier with slurry containing an alumina powder in which platinum is ion-exchanged. The exhaust gas purification device is defined as Example 5.

Example 6

The exhaust gas purification device is configured same as Example 5 except that the amount of ozone injected (fed) from the ozone injecting nozzle is 55 ppm. The exhaust gas purification device is defined as Example 6.

Example 7

The exhaust gas purification device is configured same as Example 5 except that ammonia gas is injected from the fluid injecting nozzle and the amount of ammonia injected (fed) from the fluid injecting nozzle is 200 ppm. The exhaust gas purification device is defined as Example 7.

Example 8

The exhaust gas purification device is configured same as Example 7 except that the amount of ozone injected (fed) from the ozone injecting nozzle is 55 ppm. The exhaust gas purification device is defined as Example 8.

Comparative Example 3

The exhaust gas purification device is configured same as Example 5 except that ozone was not injected from the ozone injecting nozzle. The exhaust gas purification device is defined as Comparative Example 3.

Comparative Example 4

The exhaust gas purification device is configured same as Example 7 except that ozone was not injected from the ozone injecting nozzle. The exhaust gas purification device is defined as Comparative Example 4.

<Comparative Test 2 and Evaluation>

By changing the rotation speed and the load of the engine, $NO_x$ reduction ratio was measured when the temperature of the exhaust gas exhausted from exhaust pipes of the engines of Examples 5 to 8 and Comparative Examples 3 and 4 was slowly increased from 150° C. to 200° C. The results are shown in FIGS. 10 and 11.

Figure 10:
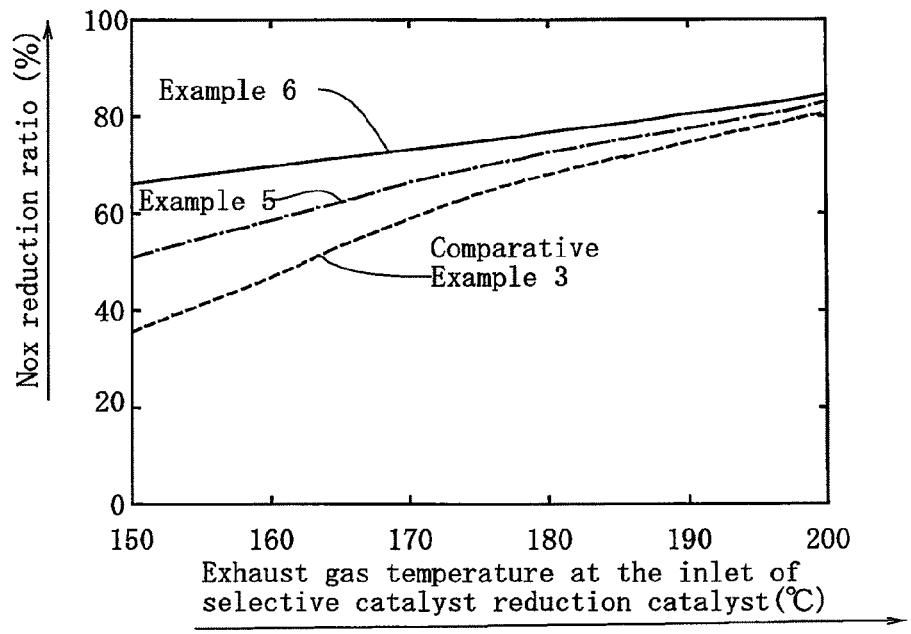
FIG. 10 is a figure indicative of a change in $NO_x$ reduction ratio in response to a change in the exhaust gas temperature, using the exhaust gas purification devices of Examples 5 and 6 and Comparative Example 3 in which a urea fluid is an urea water and the amount of ozone added is changed.

As clearly shown in FIG. 10, in the exhaust gas purification device of Comparative Example 3, $NO_x$ reduction ratio at 150° C. and 170° C. were approximately 36% and 59% respectively, but in the exhaust gas purification device of Example 5, $NO_x$ reduction ratio at 150° C. and 170° C. were higher at approximately 51% and 66% respectively. In the exhaust gas purification device of Example 6, $NO_x$ reduction ratio at 150° C. and 170° C. were much higher at approximately 66% and 73% respectively. In other words, the exhaust gas purification device of Example 5 in which 30 ppm ozone was fed shows a higher $NO_x$ reduction ratio at the exhaust gas temperature ranging from 150 to 170° C. than the exhaust gas purification device of Comparative Example 3 in which ozone was not fed. The exhaust gas purification device of Example 6 in which 55 ppm ozone was fed shows a more improvement in $NO_x$ reduction ratio at the exhaust gas temperature ranging from 150 to 170° C. than the exhaust gas purification device of Example 5 in which 30 ppm ozone was fed. Herein, this is because the flow ratio of NO to $NO_2$ introduced into the selective catalytic reduction catalyst comes close to 1 to 1 representing that reduction reaction to $N_2$ proceeds more swiftly in Example 5 than Comparative Example 3 and comes much closer to 1 to 1 representing that reduction reaction to $N_2$ proceeds more swiftly in Example 6 than Example 5. In the exhaust gas purification devices of Comparative Example 3, Examples 5 and 6, $NO_x$ reduction ratio at an exhaust gas temperature of 180° C. or more was almost the same. This is because that at the exhaust gas temperature of 180° C. or more, an oxidation catalyst is activated to provide a function of oxidizing the NO in the exhaust gas to $NO_2$.

Figure 11:
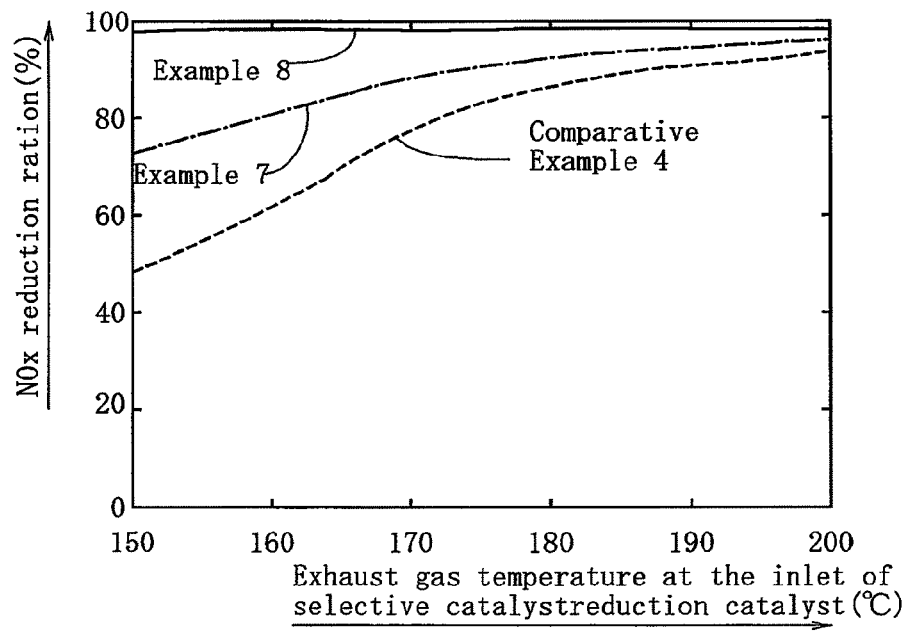
FIG. 11 is a figure indicative of a change in $NO_x$ reduction ratio in response to a change in the exhaust gas temperature, using the exhaust gas purification devices of Examples 7 and 8 and Comparative Example 4 in which a urea fluid is ammonia gas and the amount of ozone added is changed.

As clearly shown in FIG. 11, in the exhaust gas purification device of Comparative Example 4, $NO_x$ reduction ratio at 150° C. and 170° C. were approximately 49% and 78% respectively, but in the exhaust gas purification device of Example 7, $NO_x$ reduction ratio at 150° C. and 170° C. were higher at approximately 73% and 89% respectively. In the exhaust gas purification device of Example 8, $NO_x$ reduction ratio at 150° C. and 170° C. were much higher at approximately 98% and 99% respectively. In other words, the exhaust gas purification device of Example 7 in which 30 ppm ozone was fed shows a more improvement in $NO_x$ reduction ratio at the exhaust gas temperature ranging from 150 to 170° C. than the exhaust gas purification device of Comparative Example 4 in which ozone was not fed. The exhaust gas purification device of Example 8 in which 55 ppm ozone was fed shows an improvement in $NO_x$ reduction ratio at the exhaust gas temperature ranging from 150 to 170° C. than the exhaust gas purification device of Example 7 in which 30 ppm ozone was fed. The flow ratio of NO to $NO_2$ introduced into the selective catalytic reduction catalyst comes close to 1 to 1 representing that reduction reaction to $N_2$ proceeds more swiftly in Example 7 than Comparative Example 4 and comes much closer to 1 to 1 representing that reduction reaction to $N_2$ proceeds more swiftly in Example 8 than Example 7. In the exhaust gas purification devices of Comparative Example 4, Examples 7 and 8, $NO_x$ reduction ratio at an exhaust gas temperature of 180° C. or more was almost the same. This is because that at the exhaust gas temperature of 180° C. or more, an oxidation catalyst is activated to provide a function of oxidizing the NO in the exhaust gas to $NO_2$.

As clearly shown in FIGS. 10 and 11, the exhaust gas purification devices of Example 7, Example 8 and Comparative Example 4 in which ammonia gas was fed to the selective catalytic reduction catalyst shows an more improvement in $NO_x$ reduction ratio at the exhaust gas temperature ranging from 150 to 200° C. than the exhaust gas purification devices of Example 5, Example 6 and Comparative Example 3 in which a urea water is fed to the selective catalytic reduction catalyst. Herein, this is because that feeding ammonia gas to the selective catalytic reduction catalyst shows more swift reduction reaction of NO and $NO_2$ to $N_2$ than feeding a urea water to the selective catalytic reduction catalyst.

INDUSTRIAL APPLICABILITY

The exhaust gas purification device of the present invention can be used as a device that purifies exhaust gas by reducing $NO_x$ contained in the exhaust gas of an engine such as a diesel engine.

The invention claimed is:

1. An exhaust gas purification device comprising:
   a selective catalytic reduction catalyst capable of reducing $NO_x$ in an exhaust gas to $N_2$ arranged in an exhaust pipe of an engine;
   a fluid feed comprising:
      a urea tank configured to store a urea fluid that functions as a reducing agent in said selective catalytic reduction catalyst;
      a fluid injecting nozzle facing the exhaust pipe on the exhaust gas upstream side from said selective catalytic reduction catalyst and feeds the urea fluid from the fluid injecting nozzle to said exhaust pipe;
      a fluid feed pipe having a first end communicating with the fluid injecting nozzle, and further having a second end communicating with the urea tank;
      a pump configured to pump the urea fluid through the fluid feed pipe from the urea tank to the fluid injecting nozzle;
      a flow feed rate regulating valve configured to regulate the amount of the urea fluid fed from the fluid injecting nozzle to said exhaust pipe, the flow feed rate regulating valve comprising:
         a fluid pressure regulating valve configured to regulate the pressure of the urea fluid supplied to the fluid injecting nozzle; and
         a fluid opening/closing valve configured to opening and closing a proximal end of the fluid injecting nozzle;
   an ozone feed comprising:
      an ozone injecting nozzle facing the exhaust pipe on the exhaust gas upstream side from said selective catalytic reduction catalyst and on the exhaust gas upstream side from said fluid injecting nozzle and feeds an ozone capable of oxidizing NO in said exhaust gas to $NO_2$ from the ozone injecting nozzle to said exhaust pipe;
      an ozone feed pipe having a tip end connected to the ozone injecting nozzle and having a proximal end open to the atmosphere;
      a compressor configured to pump air to the ozone feed pipe;
      an ozone converter configured to convert part of oxygen contained in the air into the ozone; and
      an ozone feed rate regulating valve configured to regulate the volume of the ozone supplied from the ozone injecting nozzle; and
   a controller configured to regulate the pump, the fluid pressure regulating valve, the fluid opening/closing valve, the compressor, the ozone convertor, and the ozone feed rate regulating valve in accordance with engine rotation speed, engine load, and exhaust gas temperature of the selective catalytic reduction catalyst inlet, wherein:
   the controller drives the compressor, the ozone converter, and the ozone feed rate regulating valve so as to intermittently inject the ozone from the ozone injecting nozzle to the exhaust pipe, and drives the pump, the fluid pressure regulating valve, and the opening/closing valve so as to intermittently inject the urea fluid from the urea injecting nozzle to the exhaust pipe, when the exhaust gas temperature of the selective catalytic reduction catalyst inlet is 100 to 200° C. and the engine is in a no-load operation, and
   the controller stops driving the compressor, the ozone converter, and the ozone feed rate regulating valve so as to stop injecting the ozone from the ozone injecting nozzle to the exhaust pipe, and drives the pump, the fluid pressure regulating valve, and the opening/closing valve so as to intermittently inject the urea fluid from the urea injection nozzle to the exhaust pipe, when the exhaust gas temperature of the selective catalytic reduction catalyst inlet is 200° C. or more.

2. The exhaust gas purification device according to claim 1, wherein said urea fluid is any of an ammonia gas or a urea water.

3. The exhaust gas purification device according to claim 1, wherein said selective catalytic reduction catalyst is configured by coating a honeycomb carrier with zeolite or zirconia.

4. The exhaust gas purification device according to claim 1, further comprising:
   an ozone generator configured to generate the ozone by using oxygen in the air, the ozone generator comprising:
      a compressor configured to pump the air to the ozone feed pipe; and
      an ozone converter configured to convert part of the oxygen contained in the air into the ozone; and
   an oxidation catalyst capable of oxidizing NO in said exhaust gas to $NO_2$ at the temperature which is a specific exhaust gas temperature or higher provided in an exhaust pipe on the exhaust gas upstream side from said fluid injecting nozzle and said ozone injecting nozzle, wherein:
   the controller drives the compressor, the ozone converter, and the ozone feed rate regulating valve so as to intermittently inject the ozone from the ozone injecting nozzle to the exhaust pipe, and drives the pump, the fluid pressure regulating valve, and the opening/closing valve so as to intermittently inject the urea fluid from the urea injecting nozzle to the exhaust pipe, when the exhaust gas temperature of the selective catalytic reduction catalyst inlet is under 180° C. and the engine is in a no-load operation, and the controller stops the drive of the compressor, the ozone converter, and the ozone feed rate regulating valve so as to stop injecting the ozone from the ozone injecting nozzle to the exhaust pipe, and drives the pump, the fluid pressure regulating valve, and the opening/closing valve so as to intermittently inject the urea fluid from the urea injecting nozzle to the exhaust pipe, when the exhaust gas temperature of the selective catalytic reduction catalyst inlet is 180° C. or more.

5. The exhaust gas purification device according to claim 4, wherein said urea fluid is any of an ammonia gas or a urea water.

6. The exhaust gas purification device according to claim 4, wherein said selective catalytic reduction catalyst is configured by coating a honeycomb carrier with zeolite or zirconia.

7. The exhaust gas purification device according to claim 4, wherein a particulate filter that is filtering a particulate in said exhaust gas is arranged in the exhaust pipe on the exhaust gas upstream side from said fluid injecting nozzle and said ozone injecting nozzle and on the exhaust gas downstream side from said oxidation catalyst.

8. The exhaust gas purification device according to claim 1, said ozone generator further comprising:
   a drier that dries the compressed air compressed by the compressor; and
   an air separator that separates the compressed air dried by said drier into an oxygen-enriched gas having a high oxygen concentration and a nitrogen-enriched gas having a high nitrogen concentration arranged between said drier and said ozone converter, wherein part of oxygen in the oxygen-enriched gas separated by said air separator is introduced into said ozone converter to be converted into ozone by said ozone converter, and the moisture in said drier is removed by the nitrogen-enriched gas separated by said air separator to recycle said drier.

9. The exhaust gas purification device according to claim 8, wherein an air tank that stores the compressed air compressed by said compressor is arranged between said compressor and said drier.

10. The exhaust gas purification device according to claim 8, wherein a nitrogen-enriched gas separated by said air separator passes through a purge pipe to be fed into said drier, and a nitrogen-enriched gas flow regulating valve that regulates the flow rate of said nitrogen-enriched gas passing through the purge pipe is arranged in said purge pipe.

11. The exhaust gas purification device according to claim 10, wherein an air tank that stores the compressed air compressed by said compressor is arranged between said compressor and said drier.

12. The exhaust gas purification device according to claim 8, wherein said air separator is composed of an oxygen-enriched membrane, said oxygen-enriched gas is generated when the compressed air dried by said drier passes through said oxygen-enriched membrane, and said nitrogen-enriched gas is generated when the compressed air dried by said drier does not pass through said oxygen-enriched membrane.

13. The exhaust gas purification device according to claim 12, wherein an air tank that stores the compressed air compressed by said compressor is arranged between said compressor and said drier.

14. The exhaust gas purification device according to claim 12, wherein a nitrogen-enriched gas separated by said air separator passes through a purge pipe to be fed into said drier, and a nitrogen-enriched gas flow regulating valve that regulates the flow rate of said nitrogen-enriched gas passing through the purge pipe is arranged in said purge pipe.

15. The exhaust gas purification device according to claim 14, wherein an air tank that stores the compressed air compressed by said compressor is arranged between said compressor and said drier.

* * * * *